(12) United States Patent
Li

(10) Patent No.: US 12,052,094 B2
(45) Date of Patent: Jul. 30, 2024

(54) CONTROL WORD TRANSMISSION METHOD, APPARATUS, AND COMPUTER READABLE STORAGE MEDIUM

(71) Applicant: SANECHIPS TECHNOLOGY CO., LTD., Shenzhen (CN)

(72) Inventor: Rui Li, Shenzhen (CN)

(73) Assignee: SANECHIPS TECHNOLOGY CO., LTD., Shenzhen (CN)

(*) Notice: Subject to any disclaimer, the term of this patent is extended or adjusted under 35 U.S.C. 154(b) by 362 days.

(21) Appl. No.: 17/618,287

(22) PCT Filed: Jun. 2, 2020

(86) PCT No.: PCT/CN2020/093828
§ 371 (c)(1),
(2) Date: Dec. 10, 2021

(87) PCT Pub. No.: WO2020/248865
PCT Pub. Date: Dec. 17, 2020

(65) Prior Publication Data
US 2022/0368445 A1    Nov. 17, 2022

(30) Foreign Application Priority Data
Jun. 12, 2019   (CN) .......................... 201910506696.8

(51) Int. Cl.
*H04L 5/00* (2006.01)
*H04J 3/12* (2006.01)

(52) U.S. Cl.
CPC .............. *H04J 3/12* (2013.01); *H04L 5/0053* (2013.01)

(58) Field of Classification Search
CPC ........ H04J 3/12; H04L 5/0053; H04L 5/1469; Y02D 30/70
(Continued)

(56) References Cited

U.S. PATENT DOCUMENTS 9,332,567 B1 * 5/2016 Ali .......................... H04W 24/04
2009/0239477 A1 * 9/2009 Yamamoto .............. H04W 8/26
455/68

(Continued)

FOREIGN PATENT DOCUMENTS

CN    102647813 A    8/2012
CN    102740377 A    10/2012
(Continued)

OTHER PUBLICATIONS

International Searching Authority. International Search Report and Written Opinion for PCT Application No. PCT/CN2020/093828 and English translation, mailed Sep. 2, 2020, pp. 1-10.
(Continued)

*Primary Examiner* — Robert J Lopata
(74) *Attorney, Agent, or Firm* — Vivacqua Crane, PLLC

(57) ABSTRACT

Disclosed are a method and an apparatus for control word transmission, and a non-transitory computer-readable storage medium. The method for control word transmission comprises acquiring a control word descriptor information table configured to indicate attribute information of at least one control word, extracting a control word from a control word payload according to the control word descriptor information table, and filling the extracted control word into a common public radio interface (CPRI) control word transmitter.

12 Claims, 6 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2011/0032910 A1 | 2/2011 | Aarflot et al. | |
| 2011/0143813 A1* | 6/2011 | Ohashi ................. | H04W 88/08 |
| | | | 455/561 |
| 2015/0180626 A1* | 6/2015 | Hao ..................... | H04J 3/1605 |
| | | | 370/329 |
| 2016/0277964 A1* | 9/2016 | Xu ....................... | H04W 88/085 |
| 2017/0063491 A1 | 3/2017 | Bruckman et al. | |
| 2018/0124640 A1* | 5/2018 | Jiang .................... | H04W 28/06 |

FOREIGN PATENT DOCUMENTS

| | | |
|---|---|---|
| CN | 105790876 A | 7/2016 |
| CN | 106412991 A | 2/2017 |
| EP | 1814341 A1 | 8/2007 |
| EP | 2328382 A1 | 6/2011 |
| WO | 2017024529 A1 | 2/2017 |

OTHER PUBLICATIONS

European Patent Office. Extended European Search Report for EP Application No. 20822434.5, mailed Jun. 20, 2022, pp. 1-7.

The State Intellectual Property Office of People's Republic of China. First Office Action for CN Application No. 2019105066968 and English translation, mailed Jun. 30, 2022, pp. 1-9.

The State Intellectual Property Office of People's Republic of China. First Search Report for CN Application No. 2019105066968 and English translation, mailed Jun. 21, 2022, pp. 1-5.

* cited by examiner

CONTROL WORD TRANSMISSION METHOD, APPARATUS, AND COMPUTER READABLE STORAGE MEDIUM

CROSS-REFERENCE TO RELATED APPLICATION

This application is a national stage filing under 35 U.S.C. § 371 of international application number PCT/CN2020/093828, filed Jun. 2, 2020, which claims priority to Chinese patent application No. 201910506696.8, filed Jun. 12, 2019. The contents of these applications are incorporated herein by reference in their entirety

TECHNICAL FIELD

The present disclosure relates to the technical field of communication, for example, to a method and an apparatus for control word transmission, and a non-transitory computer readable storage medium.

BACKGROUND

In a 5G communication system, to satisfy the requirements of low delay, high bandwidth, large data transmission and the like required in new networking scenarios, Ethernet forwarding interface protocols such as Radio over Ethernet (RoE) protocol, enhanced CPRI (eCPRI) protocol, and the like have been introduced into the conventional forwarding interface—Common Public Radio Interface (CPRI) protocol. Compared with the CPRI protocol, the Ethernet forwarding interface protocol separates control words from Inphase Quadrature (IQ) data and independently package Ethernet messages for transmission, for satisfying the requirements of 5G networking scenarios in a more flexible manner. The Ethernet forwarding interface protocol (RoE protocol or eCPRI protocol) and the CPRI protocol exist simultaneously in a star networking scenario, a chain networking scenario or other composite networking scenarios.

In practical application scenarios, the RoE protocol or the eCPRI protocol is used between the Radio Equipment Controller (REC) and the master Radio Equipment (RE). The CRPI protocol is used between the master RE (the Ethernet forwarding interface protocol is adopted for the uplink port and the CPRI forwarding interface protocol is adopted for the downlink port for common connection to the REC) and the slave RE (both the uplink port and the downlink port adopt the CRPI protocol), and between slave REs. When the REC transfers control words with slave REs of multiple levels, the master RE may convert the RoE protocol or the eCPRI protocol to the CPRI protocol. Due to the presence of time division multiplexing control words (different control words are transmitted at the same control word positions in different superframes), control word messages are required to be transmitted and received in strict accordance with the timing between the REC and the master RE in superframes where time division multiplexing control words are valid, and each superframe is processed. As a result, high timing precision of the REC and the master RE is required, hardware circuits of the REC and the master RE are very complex to implement, and more message transmitting and receiving flow will be occupied.

Therefore, in the 5G communication system, how to effectively satisfy the requirements of new networking scenarios and provide an implementation method with low timing precision, low hardware circuit implementation difficulty and low control word message flow is a technical problem to be urgently solved by those having ordinary skills in the art.

SUMMARY

According to the present disclosure provided is a method and an apparatus for control word transmission, and a non-transitory computer-readable storage medium, for reducing the requirements for high-precision timing packet transmission between a REC and a master RE, reducing the implementation complexity of hardware circuits and decreasing the flow for transmission of control words between the REC and the master RE.

According to an embodiment of the present disclosure provides a method for control word transmission. The method may include steps of acquiring a control word descriptor information table configured to indicate attribute information of at least one control word; extracting a control word from a control word payload according to the control word descriptor information table; and filling the extracted control word into a common public radio interface (CPRI) control word transmitter.

According to another embodiment of the present disclosure further provided is a method for control word transmission. The method may include steps of acquiring a control word descriptor information table, the control word descriptor information table being used to indicate attribute information of at least one control word; collecting a control word from a common public radio interface (CPRI) control word receiver according to the control word descriptor information table; and filling the collected control word into a control word payload.

According to yet another embodiment of the present disclosure further provided is a non-transitory computer-readable storage medium. The computer-readable storage medium is configured to store one or more programs which, when executed by one or more processors, cause the one or more processors to carry out one of the methods for control word transmission described above.

According to yet another embodiment of the present disclosure further provided is an apparatus for control word transmission. The apparatus may include a processor and a memory, the processor is configured to execute programs stored in the memory to carry out one of the methods for control word transmission described above.

According to yet another embodiment of the present disclosure further provided is an apparatus for control word transmission. The apparatus may include a control word extractor, a first filler and a CPRI control word transmitter.

The control word extractor is configured to acquire a control word descriptor information table configured to indicate attribute information of one or more control words, and to extract a control word from a control word payload according to the control word descriptor information table.

The first filler is configured to fill the extracted control words into the CPRI control word transmitter.

The CPRI control word transmitter is configured to transmit the control word.

According to yet another embodiment of the present disclosure further provided is an apparatus for control word transmission. The apparatus may include a CPRI control word receiver, a control word collector and a second filler.

The CPRI control word receiver is configured to receive a control word.

The control word collector is configured to acquire a control word descriptor information table configured to indicate attribute information of one or more control words, and to collect a control word from the CPRI control word receiver according to the control word descriptor information table.

The second filler is configured to fill the collected control word into a control word payload.

DETAILED DESCRIPTION

The embodiments of the present disclosure will be described in detail below with reference to the accompanying drawings. The steps shown in the flowcharts in the accompanying drawings can be executed in a computer system, for example, with a set of computer-executable instructions. In addition, although a logic order is shown in the flowcharts, in some cases, the steps shown or described herein may be executed in an order different from this logic order.

Figure 1:
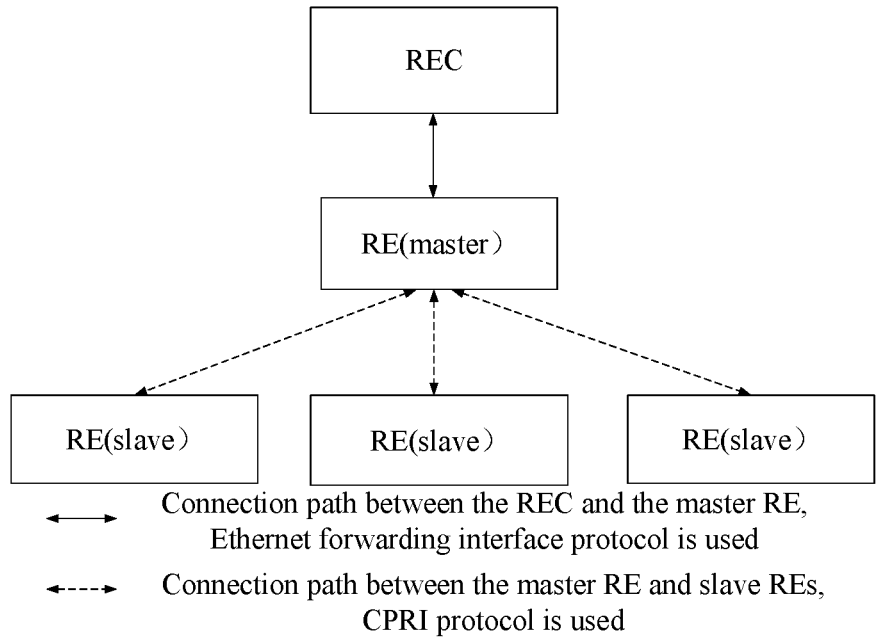
FIG. 1 is a schematic diagram illustrating the networking relationship between a REC and REs.

In a 5G communication system, to satisfy the requirements of new networking scenarios, the Ethernet forwarding interface is used as the most important link for uplink and downlink data transmission, and the Ethernet forwarding interface protocol is often applied between an REC and a master RE, between the master RE and slave REs and between slave REs as a new transmission protocol for separately transmitting control words and IQ data. Therefore, the continued use of the CPRI protocol is to better utilize the existing resources. FIG. 1 shows a common connection relationship.

The method provided in an embodiment of the present disclosure is to transmit control words in a control word payload to slave REs at multiple levels according to the CPRI protocol under the premise of solving the problems of high timing precision of transmission of control words between the REC and the master RE, high hardware circuit implementation difficulty, large control word message flow, or the like. The implementation steps of the present disclosure will be described below by embodiments.

Embodiment I—a First Method for Control Word Transmission

The method for control word transmission in this embodiment is mainly applied to the case of transmitting control words from an REC to an RE.

A message transmission mode of Ethernet forwarding interface protocol packaging is used between the REC and a master RE. For example, the control word message contains: a standard Ethernet message encapsulation header (e.g., medium access control (MAC), Internet protocol (IP), user datagram protocol (UDP), etc.), an Ethernet forwarding interface protocol encapsulation header (e.g., RoE, eCPRI, etc.) and a control word payload. The method provided by the embodiment of the present disclosure is to transmit control words in a control word payload to multiple levels of slave REs according to the CPRI protocol under the premise of solving the problems of high timing precision of transmission of control words between the REC and the master RE, high hardware circuit implementation difficulty, large control word message flow, or the like.

Figure 2:
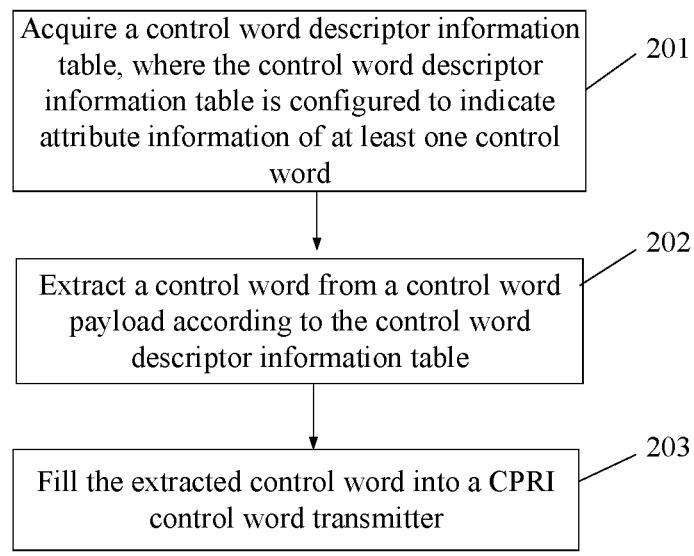
FIG. 2 is a schematic flowchart of a method for transmitting a control word from a REC to a RE according to an embodiment of the present disclosure.

As shown in FIG. 2, according to the embodiment of the present disclosure, a method for control word transmission includes steps S201 to S203.

At S201, a control word descriptor information table is acquired, the control word descriptor information table is used to indicate attribute information of one or more control words.

In an embodiment, the control word descriptor information table is determined by the REC and the master RE through signaling negotiation.

In an embodiment, the attribute information includes: time division multiplexing attribute E, bit width W, depth D, basic frame number L in a CPRI frame, and starting superframe number S in the CPRI frame.

It is to be noted that, the depth in the descriptor information table should be the same as the number of control words.

In an embodiment, the step of S201 includes following steps S2010 and S2011.

At S2010, the number N of control words in a control word payload is acquired.

The value range of N depends on the number P of control word payloads, the proportion of time division multiplexing control words in each control word payload, and the depth D and bit width W (may be in the unit of bit) of each time division multiplexing control word. The control word payload has a bit width of M (may be in unit of byte). In an application example, all time division multiplexing control words have a depth D of 8 and a bit width W of 64, the non-time division multiplexing control words have a bit width W of 64, and the control word payload has a bit width M of 8.

The value range of the number N of control words is as follows:

a. when there are all non-time division multiplexing control words in the control word payload: N=P;

b. when the control word payload contains both time division multiplexing control words and non-time division multiplexing control words: P/D<N<P; and c. when there are all time division multiplexing control words in the control word payload: N=P/D=P/8.

Figure 3:
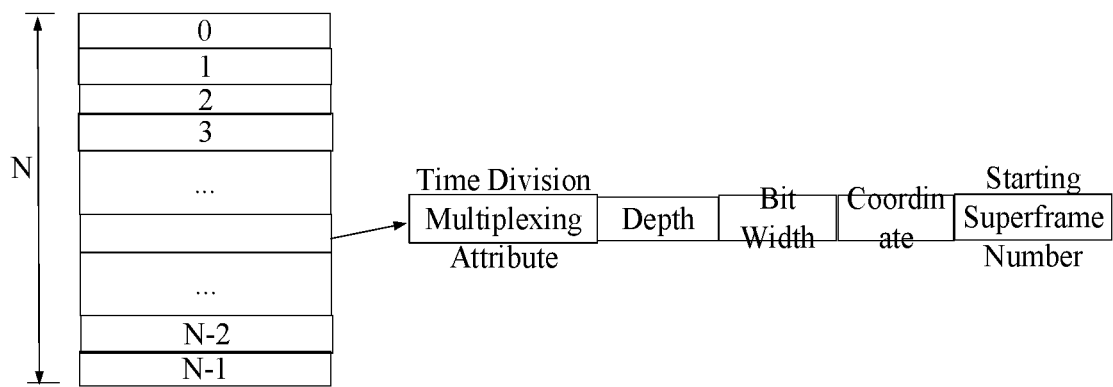
FIG. 3 is a sequence diagram of a control word descriptor information table according to an embodiment of the present disclosure.

At S2011, descriptor information corresponding to N control words is configured, where the meanings of N descriptor configuration information fields are shown in FIG. 3, and N descriptor configuration information bits are the same and represent the following meanings:

time division multiplexing attribute E: configured to indicate whether the corresponding control word in the control word payload is a time division multiplexing control word;

depth D: configured to indicate the depth of control words in the control word payload;

bit width W: configured to indicate the bit width of control words in the control word payload;

coordinate L: configured to indicate the coordinate (basic frame number) of a control word in the control word payload in a superframe; and starting super-frame number S: configured to indicate the superframe number of a control word in the control word payload starting in a radio frame.

When the time division multiplexing attribute E in the control word descriptor information table indicates that a control word is a non-time division multiplexing control word, for this control word, it is only necessary to focus on the bit width W and coordinate L in the table.

The acquisition of multiple parameters in the control word descriptor information table can be carried out through signaling negotiation between the REC and the master RE before link establishment, to ensure the consistency of parameters used in transmitting and receiving directions.

At S202, a control word is extracted from a control word payload according to the control word descriptor information table.

In an embodiment, the step of S202 includes:

determining the number N of control words in the control word payload, each control word including D time division multiplexing control words or one non-time division multiplexing control word; and cyclically performing the following steps for i from 1 to N, where i is a natural number from 1 to N:

determining, according to the control word descriptor information table, whether a current control word is a time division multiplexing control word;

if the current control word is a non-time division multiplexing control word, extracting, from the control word payload, W-bit wide data as a non-time division multiplexing control word, and determining a basic frame number of the current control word in the CPRI frame according to the control word descriptor information table; and if the current control word is a time division multiplexing control word, extracting, from the control word payload, D*W-bit wide data as D time division multiplexing control words, and determining, according to the control word descriptor information table, the depth of the current control word, the basic frame number of the current control word in the CPRI frame and the starting superframe number of the current control word in the CPRI frame.

It is to be noted that, during the extraction of control words one by one, it is necessary to follow the order of control word payloads and store the extracted control words and corresponding information table parameters. When the extracted control word is a non-time division multiplexing control word, the time division multiplexing attribute E and coordinate L need to be transmitted to a storage module in a CPRI control word transmitter. When the extracted control word is a time division multiplexing control word, the time division multiplexing attribute E, depth D, coordinate L and starting superframe number S need to be transmitted to the storage module in the CPRI control word transmitter. The above extraction operation is cyclically executed from the first control word until the last control word is extracted.

Figure 4:
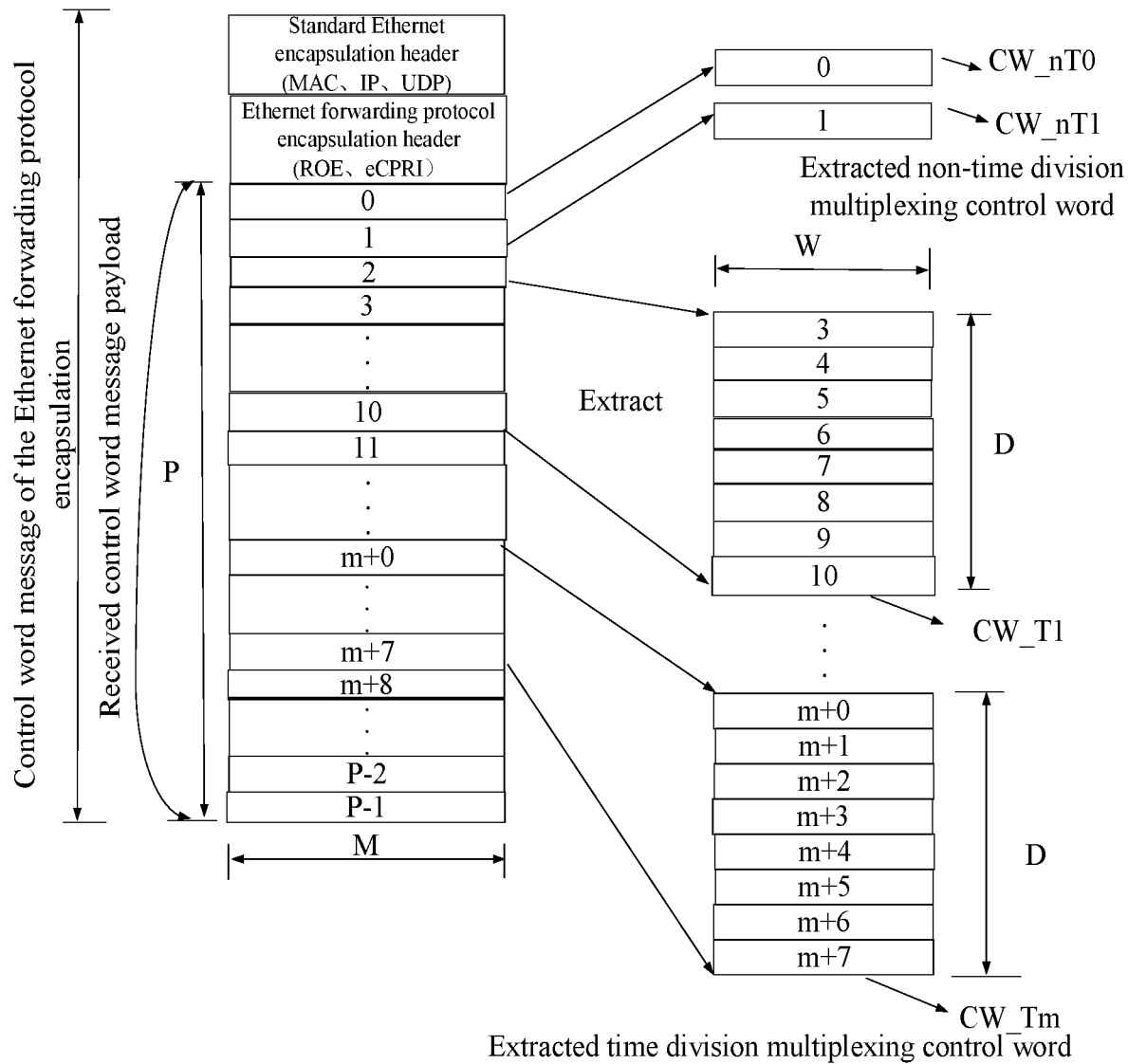
FIG. 4 is a schematic diagram of a process of extracting a control word from a control word payload according to an embodiment of the present disclosure.

FIG. 4 is a schematic diagram illustrating a process of extracting a control word from a control word payload according to an embodiment of the present disclosure, where D=8, W=64 and M=8. In the control word payload, the first and second pieces of data are non-time division multiplexing control words, and the third to tenth pieces of data and the $m^{th}$ to $(m+7)^{th}$ pieces of data are time division multiplexing control words. The time division multiplexing control words CW_T1 and CW_Tm and the non-time division multiplexing control words CW_nT0 and CW_nT1 can be extracted according to the above steps.

At S203, the extracted control words are filled into the CPRI control word transmitter.

In an embodiment, the step of S203 includes:

for a non-time division multiplexing control word, transmitting it at a basic frame having a basic frame number of L in each superframe; and for a time division multiplexing control word, transmitting it at a basic frame having a basic frame number of L in each superframe between a starting superframe number of S and an ending superframe number of (S+D−1).

For a non-time division multiplexing control word, each superframe transmits the same data; while for a time division multiplexing control word, among superframes where the time division multiplexing word is valid, each superframe transmits different data.

Figure 5:
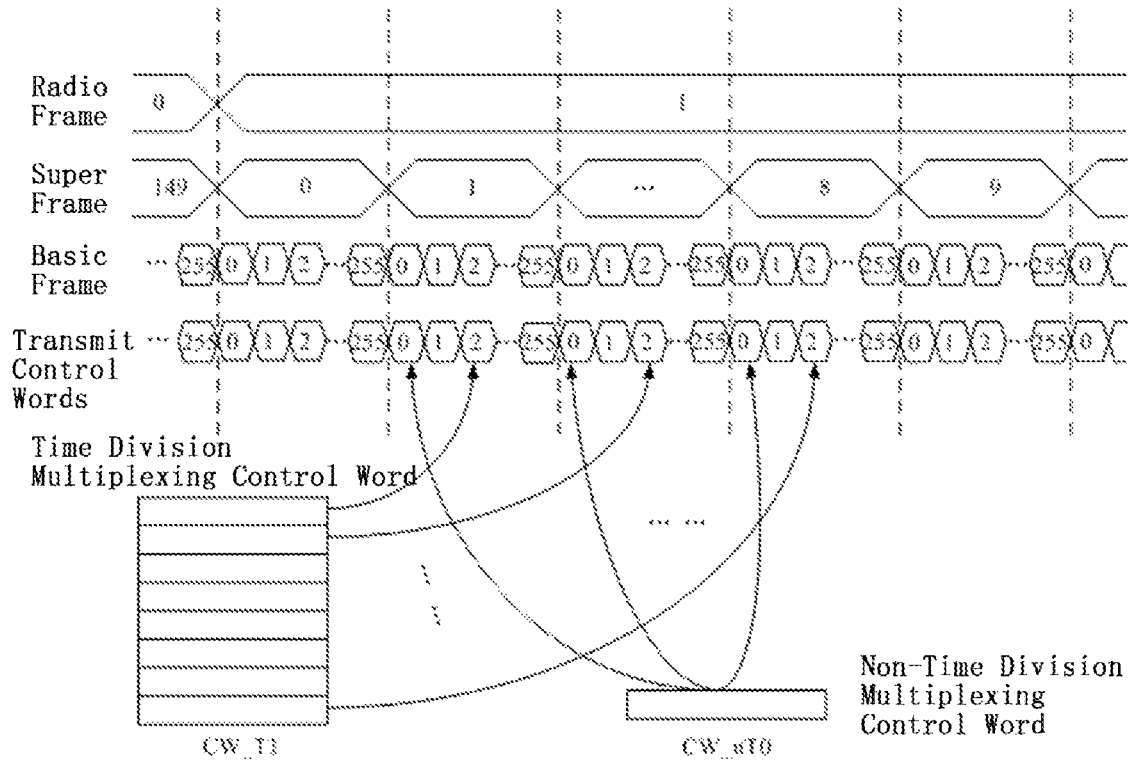
FIG. 5 is a schematic diagram of a process of transmitting a CPRI control word.

As shown in FIG. 5, the non-time division multiplexing control word is transmitted at the basic frame number L in each superframe.

The time division multiplexing control words are transmitted at the following positions:

when the superframe number is S, the first one of D time division multiplexing control words is transmitted in the current basic frame at the basic frame number L;

when the superframe number is (S+1), the second one of the D time division multiplexing control words is transmitted in the current basic frame at the basic frame number L;

. . . .

when the superframe number is (S+D−1), the last one of the D time division multiplexing control words is transmitted in the current basic frame at the basic frame number L.

All control words (non-time division multiplexing control words and time division multiplexing control words) to be transmitted in the current radio frame are transmitted by the above transmission method.

The control words in a control word message encapsulated by Ethernet forwarding interface protocol transmitted from the REC to the REs can be transmitted to multiple levels of slave REs in the form of CPRI frames according to the above steps, therefore realizing the downlink control word transmission from the REC to multiple levels of slave REs.

In accordance with the present disclosure, a control word descriptor information table is acquired, which is used to indicate attribute information of one or more control words; a control word is extracted from a control word payload according to the control word descriptor information table; and, the extracted control word is filled into a CPRI control word transmitter. Thus, under the premise of satisfying the requirements of 5G new networking scenarios, the requirements for high-precision timing packet transmission between an REC and a master RE are reduced, and the implementation complexity of hardware circuits is reduced. In addition, in accordance with the present disclosure, it is unnecessary to transmit packets in each superframe, so that the flow for transmission of control words between the REC and the master RE is decreased.

Embodiment II—a Second Method for Control Word Transmission

Data transmission is performed in the format of CPRI frames between a master RE and a slave RE, the master RE may report control word information, which is reported by multiple levels of REs to an REC, in the form of messages encapsulated by an Ethernet forwarding interface protocol.

Figure 6:
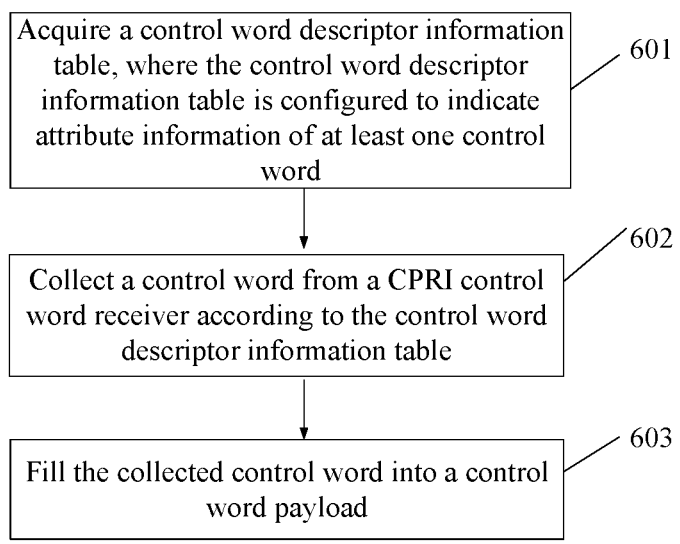
FIG. 6 is a schematic flowchart of a method for transmitting a control word from a RE to a REC according to an embodiment of the present disclosure.

As shown in FIG. 6, according to an embodiment of the present disclosure, a method for control word transmission includes steps S601 to S603.

At S601, a control word descriptor information table is acquired, where the control word descriptor information table is configured to indicate attribute information of one or more control words.

In an embodiment, the control word descriptor information table is determined by the REC and the master RE through signaling negotiation.

In an embodiment, the attribute information includes: time division multiplexing attribute E, bit width W, depth D, basic frame number L in a CPRI frame, and starting superframe number S in the CPRI frame.

In an embodiment, the step S601 includes steps S6010 and S6011.

At S6010, the number N of control words in a control word payload is acquired.

In the step, the value range of N depends on the number P of control word payloads, the proportion of time division multiplexing control words in each control word payload, and the depth D and bit width W (in unit of bit) of each time division multiplexing control word. The control word payload data has a bit width of M (in unit of byte). In an application example, all time division multiplexing control words have a depth D of 8 and a bit width W of 64, the non-time division multiplexing control words have a bit width W of 64, and the control word payload has a bit width M of 8.

The value range of the number N of control words may be as follows:
  a. when there are all non-time division multiplexing control words in the control word payload: N=P;
  b. when the control word payload contains both time division multiplexing control words and non-time division multiplexing control words: P/D<N<P; and
  c. when there are all time division multiplexing control words in the control word payload: N=P/D=P/8.

At S6011, descriptor information corresponding to N control words is configured, where the meanings of N descriptor configuration information fields are shown in FIG. 3, and N descriptor configuration information bits are the same and represent the following meanings:
  time division multiplexing attribute E: used to indicate whether the corresponding control word in the control word payload is a time division multiplexing control word;
  depth D: used to indicate the depth of control words in the control word payload;
  bit width W: used to indicate the bit width of control words in the control word payload;
  coordinate L: used to indicate the coordinate (basic frame number) of a control word in the control word payload in a superframe; and
  starting super-frame number S: used to indicate the superframe number of a control word in the control word payload starting in a radio frame.

When the time division multiplexing attribute E in the control word descriptor information table indicates that a control word is a non-time division multiplexing control word, for this control word, it is only necessary to focus on the bit width W and coordinate L in the table.

The acquisition of multiple parameters in the control word descriptor information table can be carried out through signaling negotiation between the REC and the master RE before link establishment, to ensure the consistency of parameters used in transmitting and receiving directions.

At S602, a control word is collected from a CPRI control word receiver according to the control word descriptor information table.

In an embodiment, the step of S602 includes:
  determining the number N of control words in the control word payload, each control word including D time division multiplexing control words or one non-time division multiplexing control word; and
  cyclically performing the following steps for i from 1 to N, where i is a natural number from 1 to N:
    determining, according to the control word descriptor information table, whether a current control word is a time division multiplexing control word;
    if the current control word is a non-time division multiplexing control word, collecting a non-time division multiplexing control word at a basic frame having a basic frame number of L in the current superframe; and
    if the current control word is a time division multiplexing control word, collecting D time division multiplexing control words at a basic frame having a basic frame number of L in each superframe between a starting superframe number of S and an ending superframe number of (S+D−1).

Figure 7:
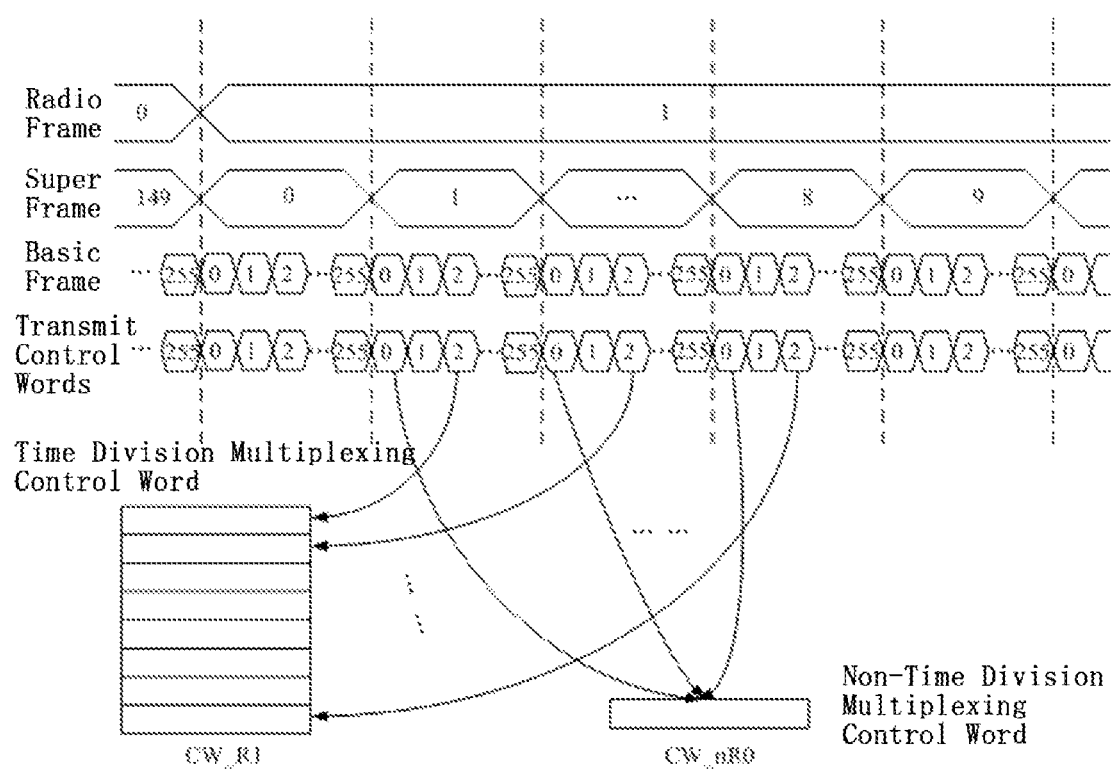
FIG. 7 is a schematic diagram of a process of collecting a CPRI control word.

As shown in FIG. 7, the non-time division multiplexing control word is collected at the basic frame number L in the current superframe.

The time division multiplexing control words are collected according to the superframe number and basic frame number in the current link in the following order:
  when the superframe number is S, at the basic frame number L, a control word contained in the current basic frame is used as the first one of the D time division multiplexing control words;
  when the superframe number is (S+1), at the basic frame number L, the control word contained in the current basic frame is used as the second one of the D time division multiplexing control words;
  . . . .
  when the superframe number is (S+D−1), at the basic frame number L, the control word contained in the current basic frame is used as the last one of the D time division multiplexing control words.

All control words (non-time division multiplexing control words and time division multiplexing control words) need to be collected in the current radio frame are collected by the above collection method.

At S603, the collected control words are filled into a control word payload.

In an embodiment, the step of S603 includes:

determining a filling order of a plurality of control words according to the control word descriptor information table; and filling the plurality of control words into the control word payload in the filling order, each non-time division multiplexing control word occupying W-bit wide data of the control word payload, and each time division multiplexing control word occupying D*W-bit wide data of the control word payload.

It is to be noted that, when the filled control word is a non-time division multiplexing control word, the non-time division multiplexing control word occupies W-bit wide data of the control word payload; and, when the filled control word is a time division multiplexing control word, the time division multiplexing control word occupies D*W-bit wide data of the control word payload. The above filling operation is cyclically executed from the first control word until the last control word is filled into the control word payload.

Figure 8:
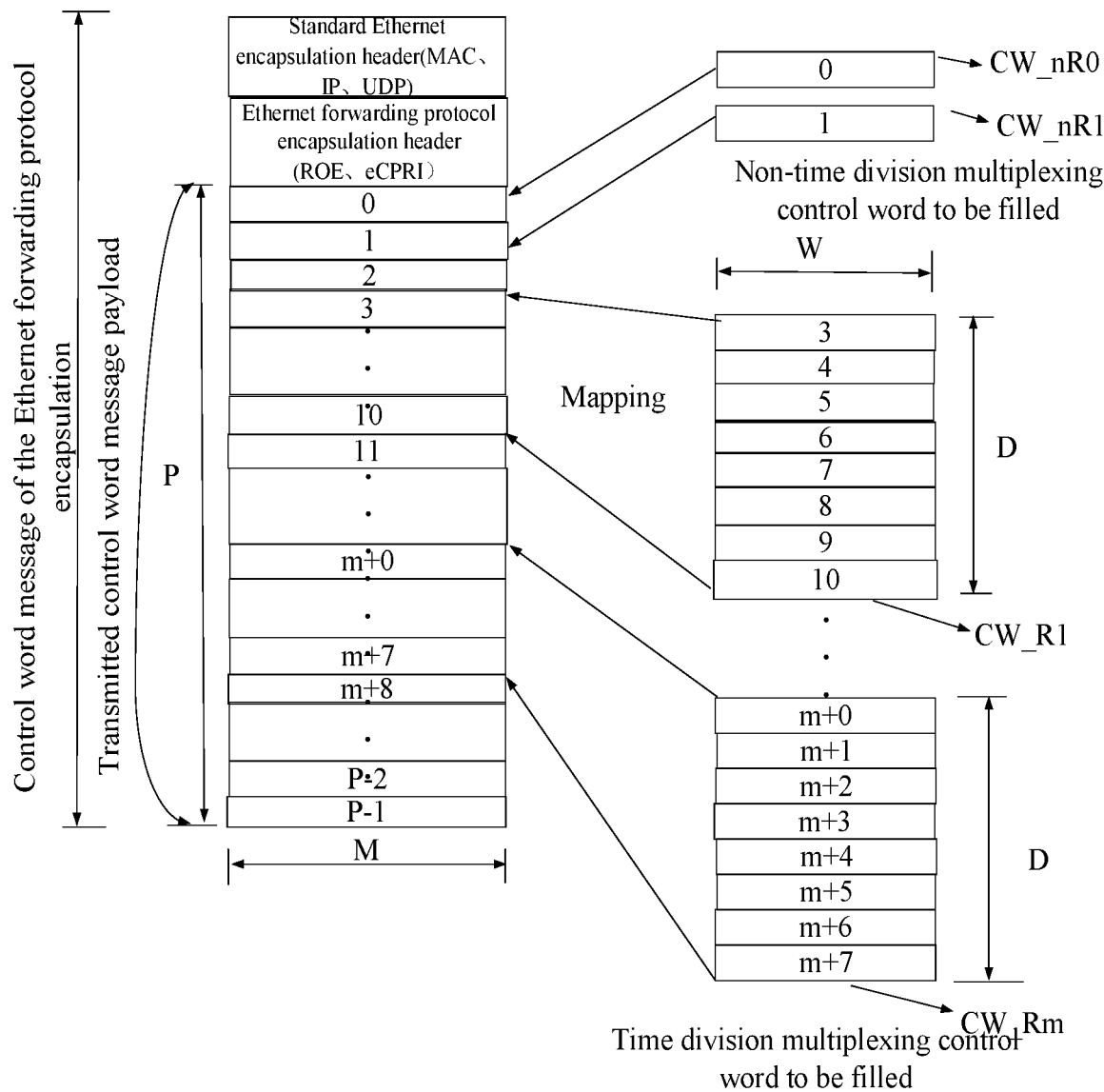
FIG. 8 is a schematic diagram of a process of filling a control word into a control word payload according to an embodiment of the present disclosure.

FIG. 8 is a schematic diagram illustrating a process of filling reported control words into a control word payload according to the present disclosure, where D=8, W=64 and M=8. In the control word payload, first and second pieces of data are non-time division multiplexing control words, and third to tenth pieces of data and $m^{th}$ to $(m+7)^{th}$ pieces of data are time division multiplexing control words. The time division multiplexing control words CW_nR0 and CW_nR1 and the non-time division multiplexing control words CW_R1 and CW_Rm can be filled into the control word payload according to the above described steps.

The master RE can fill the control words reported by all the slave REs into the control word payload according to the above steps, but the contents in the control word payload may be subjected to Ethernet forwarding interface protocol encapsulation before being transmitted to the REC, and the Ethernet forwarding interface protocol encapsulation is not within the scope of the method provided by the present disclosure. The control word payload can be transmitted to the REC only after being subjected to Ethernet forwarding protocol encapsulation, to complete the process of reporting control words by all slave REs.

The method for control word transmission according to an embodiment of the present disclosure has the following advantages.

(1) The flow for transmission of time division multiplexing control words is decreased.

By taking the whole radio frame transmitting ten time division multiplexing control words having a depth D of 8 and a bit width W of 64 and ten non-time division multiplexing control words having a bit width W of 64 as an example, the method for control word transmission of the present disclosure is quantitatively compared with the conventional method for control word transmission.

The flow consumed by the method for control word transmission of the present disclosure is:

$$Flow\_Rate_0 = Transmit\_Data/Time = 10.06 \text{ Mbit/s};$$

where $Flow\_Rate_0$ is the flow of transmitting/receiving control word messages encapsulated according to Ethernet forwarding interface protocol, which is quantitatively calculated according to the present disclosure; Transmit_Data is the amount of received/transmitted data; and, Time is the effective time of receiving/transmitting data. In this quantitative calculation example, Transmit_Data is 742 bytes, and Time is 533.6 μs. 742 bytes of Transmit_Data contain 14 bytes of the Ethernet encapsulation header (MAC message encapsulation), 8 bytes of the Ethernet forwarding interface protocol encapsulation header (RoE encapsulation), 640 bytes of the time division multiplexing control word payload, and 80 bytes of the non-time division multiplexing control word payload.

The flow consumed by the conventional method for control word transmission is:

$$Flow\_Rate_1 = Transmit\_Data/Time = 20.82 \text{ Mbit/s};$$

where $Flow\_Rate_1$ is the flow of transmitting/receiving control word messages encapsulated according to Ethernet forwarding interface protocol, which is quantitatively calculated by the conventional method for control word transmission; Transmit_Data is the amount of received/transmitted data; and, Time is the effective time of receiving/transmitting data. In this quantitative calculation example, Transmit_Data is 182 bytes*8=1456 bytes, and Time is 66.7 μs*8=533.6 μs. 1456 bytes of Transmit_Data are the amount of data transmitted by 8 superframes, and the amount of data transmitted by each superframe is 182 bytes. The 182 bytes contain 14 bytes of the Ethernet encapsulation header (MAC message encapsulation), 8 bytes of the Ethernet forwarding interface protocol encapsulation header (RoE encapsulation), 80 bytes of the time division multiplexing control word payload, and 80 bytes of the non-time division multiplexing control word payload.

It can be found by comparison that, the method according to the present disclosure can effectively decrease the flow of transmission of control words between a REC and multiple levels of slave REs. The longer the duration of control word message transmission is, the larger Time is, and the method according to the present disclosure has a better flow reduction effect.

(2) The requirement for timing precision is reduced, and the implementation complexity of hardware circuits is reduced.

In the method according to the present disclosure, during the transmission of control words between a REC and multiple levels of slave REs, control word messages are not required to be transmitted in strict accordance with superframe timing, and the requirement for timing precision and the implementation complexity of hardware circuits are reduced.

Embodiment III—Non-Transitory Computer-Readable Storage Medium

According to an embodiment of the present disclosure further provided is a computer-readable storage medium. The computer-readable storage medium stores one or more programs which, when executed by one or more processors, cause the one or more processors to carry out any one of the method for control word transmissions described above.

Embodiment IV—a First Apparatus for Control Word Transmission

According to an embodiment of the present disclosure further provided is an apparatus for control word transmission. The apparatus for control word transmission includes a processor and a memory, where the processor is configured to execute programs stored in the memory to carry out any one of the method for control word transmissions described above.

Embodiment V—a Second Apparatus for Control Word Transmission

Figure 9:
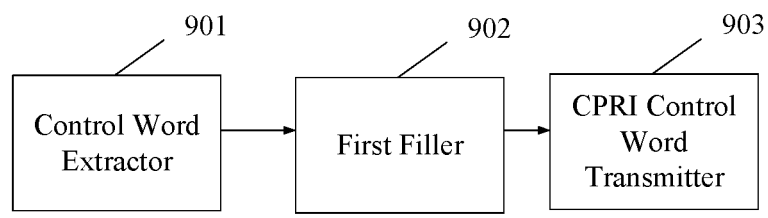
FIG. 9 is a schematic structural diagram of a first apparatus for control word transmission according to an embodiment of the present disclosure.

As shown in FIG. 9, according to an embodiment of the present disclosure, of the apparatus for control word transmission includes a control word extractor 901, a first filler 902 and a CPRI control word transmitter 903.

The control word extractor 901 is configured to acquire a control word descriptor information table, where the control word descriptor information table is configured to indicate attribute information of one or more control words. The control word extractor 901 is further configured to extract a control word from a control word payload according to the control word descriptor information table.

The first filler 902 is configured to fill the extracted control words into the CPRI control word transmitter 903.

The CPRI control word transmitter 903 is configured to transmit the control words.

In an embodiment, the CPRI control word transmitter 903 is configured to transmit, to multiple levels of slave REs, control words to be transmitted to the multiple levels of slave REs according to a CPRI protocol.

In an embodiment, the control word descriptor information table is determined by an REC and a master RE through signaling negotiation.

In an embodiment, the attribute information includes: time division multiplexing attribute E, bit width W, depth D, basic frame number L in a CPRI frame, and starting superframe number S in the CPRI frame.

The acquisition of multiple parameters in the control word descriptor information table can be carried out through signaling negotiation between the REC and the master RE before link establishment, to ensure the consistency of parameters used in transmitting and receiving directions.

In an embodiment, by the control word extractor 901, extracting a control word from a control word payload according to the control word descriptor information table includes:
  determining the number N of control words in the control word payload, each control word including D time division multiplexing control words or one non-time division multiplexing control word; and
  cyclically executing the following steps for i from 1 to N, where i is a natural number from 1 to N:
    determining, according to the control word descriptor information table, whether a current control word is a time division multiplexing control word;
    if the current control word is a non-time division multiplexing control word, extracting, from the control word payload, W-bit wide data as a non-time division multiplexing control word, and determining a basic frame number of the current control word in the CPRI frame according to the control word descriptor information table; and
    if the current control word is a time division multiplexing control word, extracting, from the control word payload, D*W-bit wide data as D time division multiplexing control words, and determining, according to the control word descriptor information table, the depth of the current control word, the basic frame number of the current control word in the CPRI frame and the starting superframe number of the current control word in the CPRI frame.

It is to be noted that, when the control word extractor 901 extracts control words one by one, it is necessary to follow the order of control word payloads and store the extracted control word and the corresponding information table parameters. When the extracted control word is a non-time division multiplexing control word, the time division multiplexing attribute E and coordinate L need to be transmitted to a storage module in the CPRI control word transmitter 903. When the extracted control word is a time division multiplexing control word, the time division multiplexing attribute E, depth D, coordinate L and starting superframe number S need to be transmitted to the storage module in the CPRI control word transmitter 903. The above extraction operation is cyclically executed from the first control word until the last control word is extracted.

FIG. 4 is a schematic diagram illustrating a process of extracting a control word from a control word payload according to an embodiment of the present disclosure, where D=8, W=64 and M=8. In the control word payload, first and second pieces of data are non-time division multiplexing control words, and third to tenth pieces of data and $m^{th}$ to $(m+7)^{th}$ pieces of data are time division multiplexing control words. The time division multiplexing control words CW_T1 and CW_Tm and the non-time division multiplexing control words CW_nT0 and CW_nT1 can be extracted according to the above steps.

In an embodiment, by the first filler 902, filling the extracted control word into the CPRI control word transmitter 903 includes:
  for a non-time division multiplexing control word, transmitting it at a basic frame having a basic frame number of L in each superframe; and
  for a time division multiplexing control word, transmitting it at a basic frame having a basic frame number of L in each superframe between a starting superframe number of S and an ending superframe number of (S+D−1).

For a non-time division multiplexing control word, each superframe transmits the same data; while for a time division multiplexing control word, among superframes where the time division multiplexing word is valid, each superframe transmits different data.

As shown in FIG. 5, the non-time division multiplexing control word is transmitted at the basic frame number L in each superframe.

The time division multiplexing control words are transmitted at the following positions:
  when the superframe number is S, the first one of D time division multiplexing control words is transmitted in the current basic frame at the basic frame number L;
  when the superframe number is (S+1), the second one of the D time division multiplexing control words is transmitted in the current basic frame at the basic frame number L;
  . . . .
  when the superframe number is (S+D−1), the last one of the D time division multiplexing control words is transmitted in the current basic frame at the basic frame number L.

The CPRI control word transmitter 903 transmits all the control words (non-time division multiplexing control words and time division multiplexing control words) to be transmitted in the current radio frame by the above transmission method.

In accordance with the apparatus for control word transmission, the control words in a control word message encapsulated by Ethernet forwarding interface protocol transmitted from the REC to the REs can be transmitted to multiple levels of slave REs in the form of CPRI frames according to the above steps, thus realizing the downlink control word transmission from the REC to multiple levels of slave REs.

Embodiment VI—a Third Apparatus for Control Word Transmission

Figure 10:
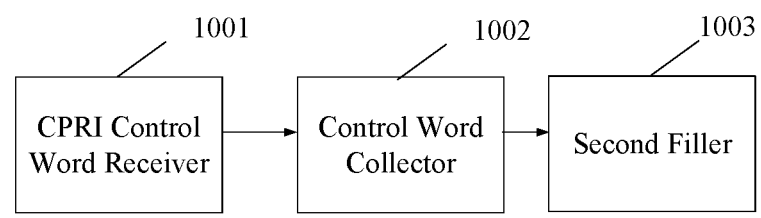
FIG. 10 is a schematic structural diagram of a second apparatus for control word transmission according to an embodiment of the present disclosure.

As shown in FIG. 10, the present disclosure further provides an apparatus for control word transmission, including a CPRI control word receiver 1001, a control word collector 1002 and a second filler 1003.

The CPRI control word receiver 1001 is configured to receive a control word.

The control word collector 1002 is configured to acquire a control word descriptor information table, where the control word descriptor information table is configured to indicate attribute information of one or more control words. The control word collector 1002 is further configured to collect a control word from the CPRI control word receiver 1001 according to the control word descriptor information table.

The second filler 1003 is configured to fill the collected control word into a control word payload.

In an embodiment, the CPRI control word receiver 1001 is configured to receive control words to be reported from multiple levels of slave REs according to a CPRI protocol.

In an embodiment, the attribute information includes: time division multiplexing attribute E, bit width W, depth D, basic frame number L in a CPRI frame, and starting superframe number S in the CPRI frame.

The acquisition of multiple parameters in the control word descriptor information table can be carried out through signaling negotiation between the REC and the master RE before link establishment, to ensure the consistency of parameters used in transmitting and receiving directions.

In an embodiment, by the control word collector 1002, collecting a control word from the CPRI control word receiver 1001 according to the control word descriptor information table includes:
 determining the number N of control words in the control word payload, each control word including D time division multiplexing control words or one non-time division multiplexing control word; and
 cyclically executing the following steps for i from 1 to N, where i is a natural number from 1 to N:
  determining, according to the control word descriptor information table, whether a current control word is a time division multiplexing control word;
  if the current control word is a non-time division multiplexing control word, collecting a non-time division multiplexing control word at a basic frame having a basic frame number of L in the current superframe; and
  if the current control word is a time division multiplexing control word, collecting D time division multiplexing control words at a basic frame having a basic frame number of L in each superframe between a starting superframe number of S and an ending superframe number of (S+D−1).

As shown in FIG. 7, the non-time division multiplexing control word is collected at the basic frame number L in the current superframe.

The time division multiplexing control words are collected according to the superframe number and basic frame number in the current link in the following order:
 when the superframe number is S, at the basic frame number L, a control word contained in the current basic frame is used as a first one of the D time division multiplexing control words;
 when the superframe number is (S+1), at the basic frame number L, the control word contained in the current basic frame is used as a second one of the D time division multiplexing control words;
 . . . .
 when the superframe number is (S+D−1), at the basic frame number L, the control word contained in the current basic frame is used as a last one of the D time division multiplexing control words.

The control word collector 1002 collects all control words (non-time division multiplexing control words and time division multiplexing control words) need to be collected in the current radio frame by the above collection method.

In an embodiment, the second filler 1003 filling the collected control word into a control word payload includes:
 determining a filling order of a plurality of control words according to the control word descriptor information table; and
 filling the plurality of control words into the control word payload in the filling order, each non-time division multiplexing control word occupying W-bit wide data of the control word payload, and each time division multiplexing control word occupying D*W-bit wide data of the control word payload.

It is to be noted that, when the filled control word is a non-time division multiplexing control word, the non-time division multiplexing control word occupies W-bit wide data of the control word payload; and, when the filled control word is a time division multiplexing control word, the time division multiplexing control word occupies D*W-bit wide data of the control word payload. The second filler 1003 cyclically executes the above filling operation from the first control word until the last control word is filled into the control word payload.

FIG. 8 is a schematic diagram illustrating a process of filling the reported control word into a control word payload according to the present disclosure, where D=8, W=64 and M=8. In the control word payload, first and second pieces of data are non-time division multiplexing control words, and third to tenth pieces of data and $m^{th}$ to $(m+7)^{th}$ pieces of data are time division multiplexing control words. The time division multiplexing control words CW_nR0 and CW_nR1 and the non-time division multiplexing control words CW_R1 and CW_Rm can be filled into the control word payload according to the above described steps.

According to the above steps, the second filler 1003 allows the master RE to fill the control words reported from all slave REs into the control word payload, and the contents in the control word payload may be subjected to Ethernet forwarding interface protocol encapsulation before being transmitted to the REC, where the Ethernet forwarding interface protocol encapsulation is not within the scope of the method provided by the present disclosure. The control word payload can be transmitted to the REC only after being subjected to Ethernet forwarding protocol encapsulation, to complete the process of reporting control words by all slave REs.

The invention claimed is:

1. A method for control word transmission, comprising:
 acquiring a control word descriptor information table configured to indicate attribute information of at least one control word, wherein the control word descriptor information table is determined by a Radio Equipment Controller (REC) and a master Radio Equipment (RE) through signaling negotiation;
 extracting a control word from a control word payload according to the control word descriptor information table; and
 filling the extracted control word into a common public radio interface (CPRI) control word transmitter.

2. The method for control word transmission of claim 1, wherein, the attribute information comprises: time division multiplexing attribute E, bit width W, depth D, basic frame number L in a CPRI frame, and starting superframe number S in a CPRI frame.

3. The method for control word transmission of claim 2, wherein, extracting a control word from a control word payload according to the control word descriptor information table comprises:
   determining a number N of control words in the control word payload, each of the control words comprising D time division multiplexing control words or one non-time division multiplexing control word; and
   cyclically executing following steps for i from 1 to N, where i is a natural number from 1 to N:
      determining, according to the control word descriptor information table, whether a current control word is a time division multiplexing control word;
      in response to the current control word being a non-time division multiplexing control word, extracting, from the control word payload, W-bit wide data as a non-time division multiplexing control word, and determining a basic frame number of the current control word in the CPRI frame according to the control word descriptor information table; and
      in response to the current control word being a time division multiplexing control word, extracting, from the control word payload, D*W-bit wide data as D time division multiplexing control words, and determining, according to the control word descriptor information table, the depth of the current control word, the basic frame number of the current control word in the CPRI frame and the starting superframe number of the current control word in the CPRI frame.

4. The method for control word transmission of claim 3, wherein, filling the extracted control word into a CPRI control word transmitter comprises:
   transmitting a non-time division multiplexing control word at a basic frame having a basic frame number L in each superframe; and
   transmitting a time division multiplexing control word at a basic frame having a basic frame number L in each superframe between a starting superframe number S and an ending superframe number (S+D−1).

5. A method for control word transmission, comprising:
   acquiring a control word descriptor information table configured to indicate attribute information of at least one control word, wherein the control word descriptor information table is determined by a Radio Equipment Controller (REC) and a master Radio Equipment (RE) through signaling negotiation; and
   collecting a control word from a common public radio interface (CPRI) control word receiver according to the control word descriptor information table, and filling the collected control word into a control word payload.

6. The method for control word transmission of claim 5, wherein the attribute information comprises: time division multiplexing attribute E, bit width W, depth D, basic frame number L in a CPRI frame, and starting superframe number S in the CPRI frame.

7. The method for control word transmission of claim 6, wherein, collecting a control word from a CPRI control word receiver according to the control word descriptor information table comprises:
   determining a number N of control words in the control word payload, each of the control words comprising D time division multiplexing control words or one non-time division multiplexing control word; and
   cyclically executing following steps for i from 1 to N, where i is a natural number from 1 to N:
      determining, according to the control word descriptor information table, whether a current control word is a time division multiplexing control word;
      in response to the current control word being a non-time division multiplexing control word, collecting a non-time division multiplexing control word at a basic frame having a basic frame number L in the current superframe; and
      in response to the current control word being a time division multiplexing control word, collecting D time division multiplexing control words at a basic frame having a basic frame number L in each superframe between a starting superframe number S and an ending superframe number (S+D−1).

8. The method for control word transmission of claim 7, wherein, filling the collected control word into a control word payload comprises:
   determining a filling order of a plurality of control words according to the control word descriptor information table; and
   filling a plurality of control words into the control word payload in the filling order, each non-time division multiplexing control word occupying W-bit wide data of the control word payload, and each time division multiplexing control word occupying D*W-bit wide data of the control word payload.

9. A non-transitory computer-readable storage medium, storing one or more programs, wherein the one or more programs, when executed by one or more processors, cause the one or more processors to carry out the method for control word transmission of claim 1.

10. An apparatus for control word transmission, comprising a processor and a memory, wherein the processor is configured to execute programs stored in the memory to carry out a method for control word transmission, the method for control word transmission comprising:
    acquiring a control word descriptor information table configured to indicate attribute information of at least one control word, wherein the control word descriptor information table is determined by a Radio Equipment Controller (REC) and a master Radio Equipment (RE) through signaling negotiation;
    extracting a control word from a control word payload according to the control word descriptor information table; and
    filling the extracted control word into a common public radio interface (CPRI) control word transmitter.

11. A non-transitory computer-readable storage medium, storing one or more programs, wherein the one or more programs, when executed by one or more processors, cause the one or more processors to carry out the method for control word transmission of claim 5.

12. An apparatus for control word transmission, comprising a processor and a memory, wherein the processor is configured to execute programs stored in the memory to carry out a method for control word transmission, the method for control word transmission comprising:
    acquiring a control word descriptor information table configured to indicate attribute information of at least one control word, wherein the control word descriptor information table is determined by a Radio Equipment Controller (REC) and a master Radio Equipment (RE) through signaling negotiation; and
    collecting a control word from a common public radio interface (CPRI) control word receiver according to the control word descriptor information table, and filling the collected control word into a control word payload.

* * * * *